US009807214B2

(12) United States Patent
Agrawal

(10) Patent No.: US 9,807,214 B2
(45) Date of Patent: Oct. 31, 2017

(54) TEMPORARY CONTACTS

(71) Applicant: Microsoft Technology Licensing, LLC, Redmond, WA (US)

(72) Inventor: Abhishek Agrawal, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/872,863

(22) Filed: Oct. 1, 2015

(65) Prior Publication Data

US 2017/0099376 A1 Apr. 6, 2017

(51) Int. Cl.
H04W 4/02 (2009.01)
H04M 1/2745 (2006.01)
H04W 88/02 (2009.01)

(52) U.S. Cl.
CPC ..... *H04M 1/274533* (2013.01); *H04W 4/023* (2013.01); *H04W 88/02* (2013.01)

(58) Field of Classification Search
None
See application file for complete search history.

(56) References Cited

U.S. PATENT DOCUMENTS

| 8,676,927 B2 | 3/2014 | Chang | |
| 2005/0267794 A1* | 12/2005 | Forte | G06Q 10/063112 705/7.14 |
| 2009/0036163 A1 | 2/2009 | Kimbrell | |
| 2009/0156186 A1 | 6/2009 | Lyle | |
| 2010/0011304 A1 | 1/2010 | van Os | |
| 2010/0030788 A1 | 2/2010 | Chen et al. | |
| 2010/0144331 A1 | 6/2010 | Koberg et al. | |
| 2010/0281113 A1 | 11/2010 | Laine et al. | |
| 2011/0194682 A1 | 8/2011 | Hans et al. | |
| 2012/0052848 A1 | 3/2012 | Kim | |

(Continued)

FOREIGN PATENT DOCUMENTS

| CN | 103491259 A | 1/2014 |
| CN | 103533130 A | 1/2014 |
| WO | 2014079895 A1 | 5/2014 |

OTHER PUBLICATIONS

"Temporary Contacts", Retrieved on: Mar. 12, 2015 Available at: https://play.google.com/store/apps/details?id=com.triffort.tempnumber&hl=en.

(Continued)

*Primary Examiner* — Diane Mizrahi

(57) ABSTRACT

Architecture that enables the implementation of temporary contacts by the inclusion of additional data with each contact. The additional data can comprise geolocation data such as GPS coordinates, triangulation information, or other geographical coordinate or location data technologies. Additionally, the mere presence of the additional data can be a trigger to interact with the user as to if the contact should be maintained in the long term or removed in the short term. The association of the geolocation location data of a mobile device with a contact being added and intelligent use of the geolocation data enables prompting of the user to delete or mark for deletion the contact as a temporary contact or retain the contact until marked for removal and removed. Spatial and/or temporal criteria can be manually selected or automatically set for all designated temporary contacts or on an individual basis.

20 Claims, 8 Drawing Sheets

(56) References Cited

U.S. PATENT DOCUMENTS

| | | | |
|---|---|---|---|
| 2013/0065565 A1* | 3/2013 | Koberg | H04M 1/274583 455/414.1 |
| 2013/0091156 A1 | 4/2013 | Raiche et al. | |
| 2013/0097124 A1 | 4/2013 | de Souza et al. | |
| 2013/0268357 A1* | 10/2013 | Heath | H04L 63/00 705/14.53 |
| 2013/0286892 A1* | 10/2013 | Fuste Vilella | H04W 40/00 370/254 |
| 2014/0136328 A1* | 5/2014 | Abhyanker | G06Q 10/087 705/14.58 |
| 2014/0194083 A1 | 7/2014 | Aldossary | |
| 2016/0012465 A1* | 1/2016 | Sharp | G06Q 20/18 705/14.17 |

OTHER PUBLICATIONS

"Create Temporary Contacts in Your Phone", Published on: Sep. 29, 2013, Available at: http://temporary-contacts.com/.

"International Search Report and Written Opinion Issued in PCT Application No. PCT/US2016/053683", dated Nov. 21, 2016, 11 Pages.

* cited by examiner

TEMPORARY CONTACTS

BACKGROUND

The use of contact information and contact lists are essential in existing communications systems. Significant problems in contact management systems which are not yet addressed include the lack of any deletion of the invalid contacts and the updating of the numbers of the contacts which have changed, particularly on mobile communications devices, for example. The automatic management of contacts remains a challenge as algorithms fail to understand if a contact is no longer needed and the heuristics based on time fail to achieve anything significant for the users.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the implementation of temporary contacts by the inclusion of additional data with each contact. The additional data comprises geolocation data such as GPS (global positioning system) coordinates, triangulation information, or other geographical coordinate or location information technologies. Additionally, the mere presence of the additional data can be a trigger to interact with the user as to if the contact should be maintained in the long term or removed in the short term.

In a more specific implementation, the architecture enables the association of the GPS location of a cellphone or other suitably-equipped device with a contact being added and intelligent use of the GPS location to prompt the user to delete or mark for deletion the contact as a temporary contact or retain the contact until marked for removal and removed. Moreover, the time for deletion (e.g., two weeks) can be manually selected or automatically set for all designated temporary contacts or on an individual basis using other criteria. For example, if the user remains within a geographical area, the time for deletion can be based on whether the user remains in the geolocation.

The disclosed architecture can be implemented as a system, comprising: a contact component of a user device configured to receive contact geographical location information related to a contact of a contact list, assign the contact geographical location information to the contact, enable tagging of the contact as a temporary contact, and removal of the temporary contact from the contact list of the user device based on at least one of spatial criteria or temporal criteria.

The disclosed architecture can be implemented as a method, comprising acts of: identifying geographical location information of a contact received at a user device; storing the geographical location information in association with the contact in a contact list of the user device; and updating existence of the contact in the contact list based on the geographical location information.

The disclosed architecture can be implemented as an alternative method, comprising acts of: detecting a new contact using a mobile communications device; tagging the new contact as a temporary contact; assigning contact geographical location information to the new contact that relates to a geographical location of the new contact; identifying device geographical location information of the mobile communications device that relates to a geographical location of the mobile communications device; and, removing the new contact from the mobile communications device based on user input or updated device geographical location information of the mobile communications device.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
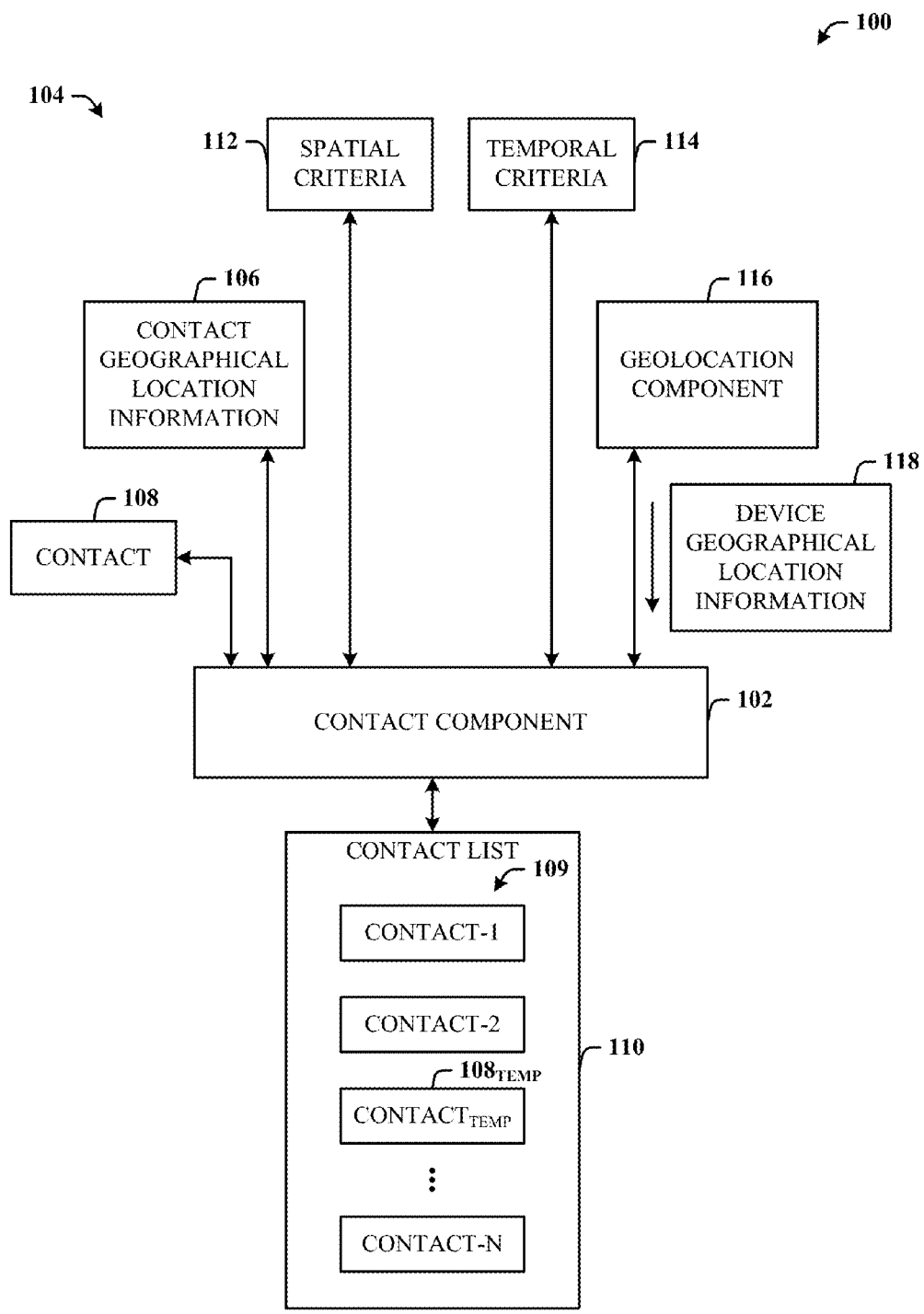
FIG. 1 illustrates a system in accordance with the disclosed architecture.

Keeping a contact list updated is challenging as users add new contacts and, in accordance with existing systems, retain old contacts that are no longer useful. Moreover as user mobility is becoming far easier and in many cases, essential for work and play, the activity of user contact lists is becoming more frequent. Associated with each moment also comes the local contacts which are valid only when user is living in particular area. For example, if a person is visiting a place (e.g., point of interest, business, home, etc.), the person may have the contact information of a cab company, cab driver, phone number of hotel, etc.

Generally, due to the dynamic nature of businesses (e.g., expansion, relocation, closure, etc.) and user movement into and out of geographical areas, the contact information (e.g., phone numbers, address, geolocation coordinates, etc.) may not be valid after a certain period of time. Hence, these contacts become invalid. This also bloats the contact list and confuses the user since the user may need to review many contacts with similar names to arrive at the desired contact.

Essentially, there are two problems with existing contact management systems which are not yet addressed—the deletion of the temporary contacts and automatic updating of the numbers of the contacts which have changed their contact numbers.

The disclosed architecture addresses these problems by enabling for each contact that gets added, the geolocation information (e.g., GPS (global positioning system) coordinates) and add an optional field which asks the user if this is a temporary contact that the user might want to delete some time in the future (e.g., after few weeks).

For example, when traveling, the user tends to get new numbers which are required only during the visit (e.g., mobile number of the cab driver). As these contacts typically added after reaching to the place of visit, by tracking the GPS location where this contact was added, the user can then use this information when the user gets back home.

All the contacts that were added by the user at the location of the visit and around the area of the visit can be subsequently filtered to enable the user to delete any of these new temporary contacts. Moreover, the name of the location such as city, state, country, etc., can be obtained and added automatically to the temporary contact being added. Note that the user can add a valid phone number of some relatives during the visit, and hence, this may not always act as the location of the contact being added. As part of the autofill location information, the user is provided the option to choose to correct the location of the added contact.

The contact (or a field, for example) when flagged by the user, can indicate the contact is a candidate for deletion after a certain amount of time once the user returns back home or the desired origin. The user can be prompted if the user then wants to delete the contact. The user device (e.g., cell phone) then takes appropriate action (delete or retain) based on user choice.

With the existence an increasing numbers of social networking sites and applications, most of the needed contacts are connected to the users on social networking sites/applications. Moreover, most of these contacts do maintain the associated contact information such as email address and mobile numbers on these applications/websites. As some cell phones are already equipped with fetching contact information from social network sites, this disclosed architecture enhances this functionality by automatically detecting duplicates, linking the duplicate contacts, and updating this number of the socially connected contacts automatically with the user driven choice.

The disclosed architecture exhibits technical effects rooted in computer technology to overcome problems specifically occurring in the realm of computer systems and networks. More specifically, the architecture provides improved usability of at least for contact management applications by automatically enabling the adding and deleting of temporary contacts that are no longer needed. This further enables the more efficient execution of applications that would otherwise be processing contacts that are no longer needed. This additional processing also increases the time until presentation of the contact lists to the user. The removal of unnecessary contacts has the effect of increasing system speed, and conserving memory due to the reduced list.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a contact component 102 of a user device 104 configured to receive contact geographical location information 106 (geographical location information of the contact, e.g., coordinates, address, entity name, etc.) related to a contact 108 (e.g., of multiple contacts 109 of a contact list 110), assign the contact geographical location information 106 to the contact 108, enable tagging of the contact 108 as a temporary contact $108_{TEMP}$, and removal of the temporary contact $108_{TEMP}$ from the contact list 110 (e.g., of the user device 104) based on spatial criteria 112 (e.g., distance) and/or temporal criteria 114 (e.g., time).

The contact component 102 can be designed to comprise the capabilities of existing contact programs such as for Outlook™ (by Microsoft Corporation), as well as the capabilities described herein for supplementing the contact with the contact geographical location information 106 and tag as a temporary contact $108_{TEMP}$.

Additionally, the contact component 102 can interface directly/indirectly to a geolocation component 116, which can be configured to capture the contact geographical location information 106 of the contact 108 and device geographical location information 118 of the user device 104, and enable access to the contact geographical location information 106 and device geographical location information 118 by the contact component 102. Thus, the geolocation component 116 can be a GPS (global positioning system) system onboard the user device 104 that determines the coordinates (device geographical location information 118) of the user device 104.

The geolocation component 116 then makes available (e.g., pushes) the device geographical location information 118 to the contact component 102 for processing relative to the contact geographical location information 106 according to at least the spatial criteria 112 as to the current distance from the contact geographical location.

In one implementation, the straight-line distance between the contact location and the device location can be computed and applied to the spatial criteria to determine when to trigger a prompt to the user to either retain the temporary contact $108_{TEMP}$ as a persisted regular contact in the contact list 110, or treat the temporary contact $108_{TEMP}$ and remove the temporary contact $108_{TEMP}$ from the contact list 110.

In an alternative implementation, the spatial criteria 112 can comprise a geofence which can be established for the temporary contact $108_{TEMP}$ and that defines a polygonal virtual perimeter about (that circumscribes) the geographical location established for the temporary contact $108_{TEMP}$. Once the location of the user device 104 is computed to intersect the geofence (via geographic data comparison), this can indicate the user is moving away from the temporary contact location and trigger a notification to the device user.

Thus, the contact component 102 can be configured to trigger (directly or indirectly) presentation of a prompt (or notification) that enables the user to remove the contact 108 (now the temporary contact $108_{TEMP}$) based on the spatial criteria which considers distance of the user device 104 from the geographical location of the contact and/or the temporal criteria which considers time from the geographical location of the contact 108 (now the temporary contact $108_{TEMP}$).

With respect to the temporal criteria 114, the amount of time elapsed while moving in a heading away from the contact location can be used to trigger the prompt to the user, to then either retain the temporary contact $108_{TEMP}$ as a persisted regular contact in the contact list 110, or treat the temporary contact $108_{TEMP}$ and remove the temporary contact $108_{TEMP}$ from the contact list 110.

The contact geographical location information 106 can be obtained from network-based sources such as publically-accessible websites that provide structured data as to business and residential location information such as addresses (e.g., occupant name, street, apartment, house number, zipcode, phone number, etc.). The contact geographical location information 106 can be automatically populated into the contact information of the contact 108 (the temporary contact 108.sub.TEMP) while the user device is within the spatial and/or temporal vicinity (as set by the respective criteria) of the contact 108. That is, the contact geographical location information 106 can be added to the contact 108 as part of adding the contact 108 as a new contact (the temporary contact 108.sub.TEMP) to the contact list 110.

Figure 2:
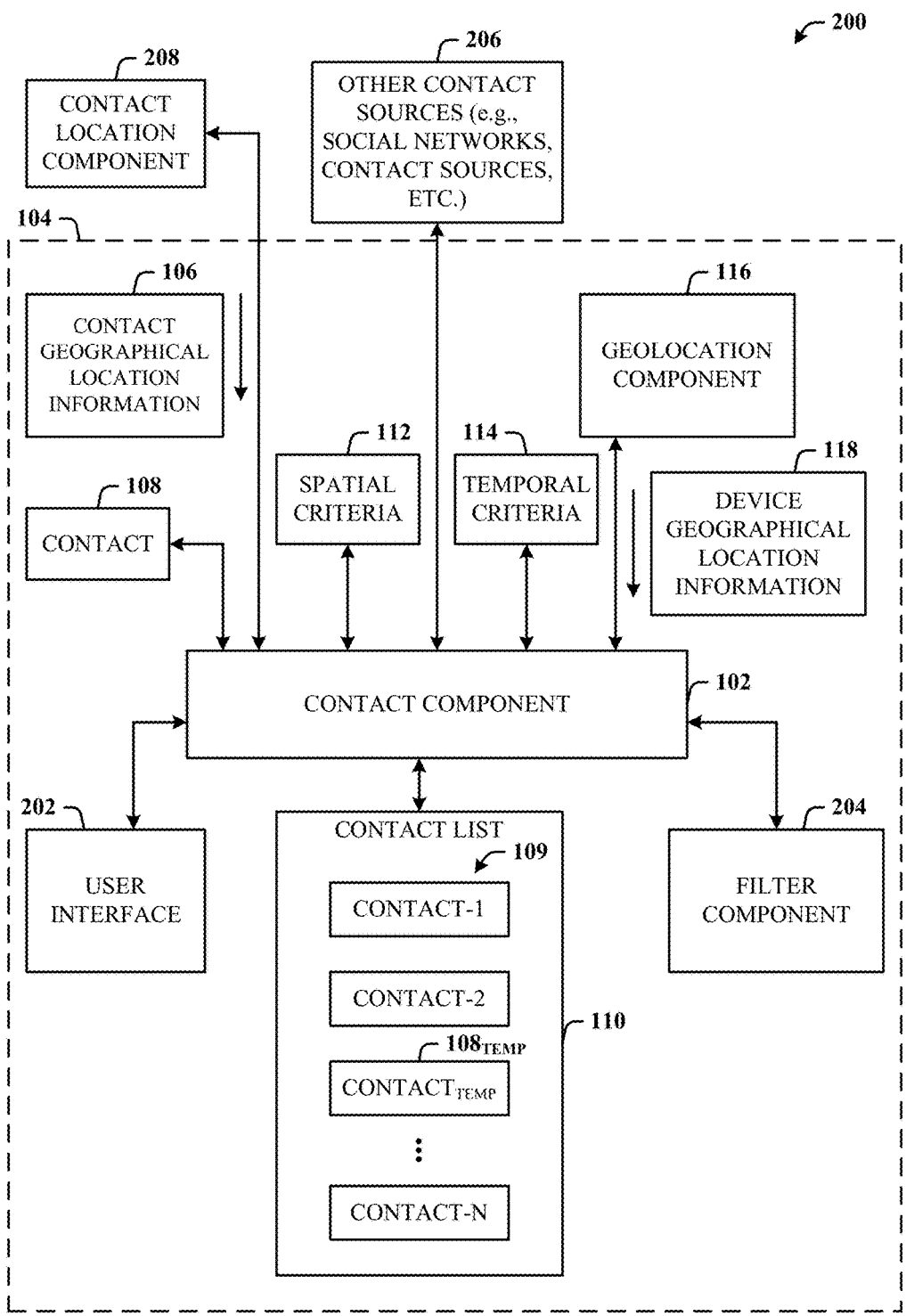
FIG. 2 illustrates an alternative system in accordance with the disclosed architecture.

FIG. 2 illustrates an alternative system 200 in accordance with the disclosed architecture. In this implementation, the system 200 comprises the system 100 and capabilities described in association with FIG. 1, with additional capabilities that relate to a user interface 202 configured to enable user engagement as to at least data entry, object selection, and response to prompts, a filter component 204 configured to enable filtering of the contacts 109 according to various filter criteria (or attributes), and, contact linking and synchronization capabilities with one or more social networks and other contact sources 206. The user interface 202 can be configured to present and enable the addition of a new contact via an add contact view, and a new contact view of the new contact and associated contact information. The filter component 204 is configured to filter the contact list 110 by at least one of temporary contacts (e.g., the temporary contact $108_{TEMP}$) or by geographic location, and enable removal of one or more of the temporary contacts via the contact component 102.

The contact component 102 can also be configured to automatically fetch contacts (e.g., contact 108) from the social networking websites and other contact sources 206, that include, but are not limited to, email applications (e.g., Outlook), messaging applications, calendars, schedulers, etc., and enable linking and updating of the fetched contacts based on user input (e.g., a user-selectable option) that enables the linking of the fetched contacts.

A contact location component 208 can be provided and configured to provide the contact geographical location information 106 to the contact component 102. The contact location component 208 can comprise one or more sources (e.g., websites, databases, etc.) that serve the contact geographical location information 106 in the desire format, such as lat-long coordinates, cross-streets, entity names, zipcode, area designators (e.g., a central park), points of interests, and the like, any one or more can be assigned to the temporary contact $108_{TEMP}$, and is searchable via the filter component 204.

It is to be understood that in the disclosed architecture, certain components may be rearranged, combined, omitted, and additional components may be included. For example, in systems 100 and 200, the spatial criteria 112, temporal criteria 114, and contact list 110 can be part of the contact component 102. In system 200, the user interface 202 and filter component 204 can be made part of the contact component 102, as well.

Additionally, in some implementations, all or some of the components are present on the client, while in other implementations some components may reside on a server or are provided by a local or remote service.

Figure 3:
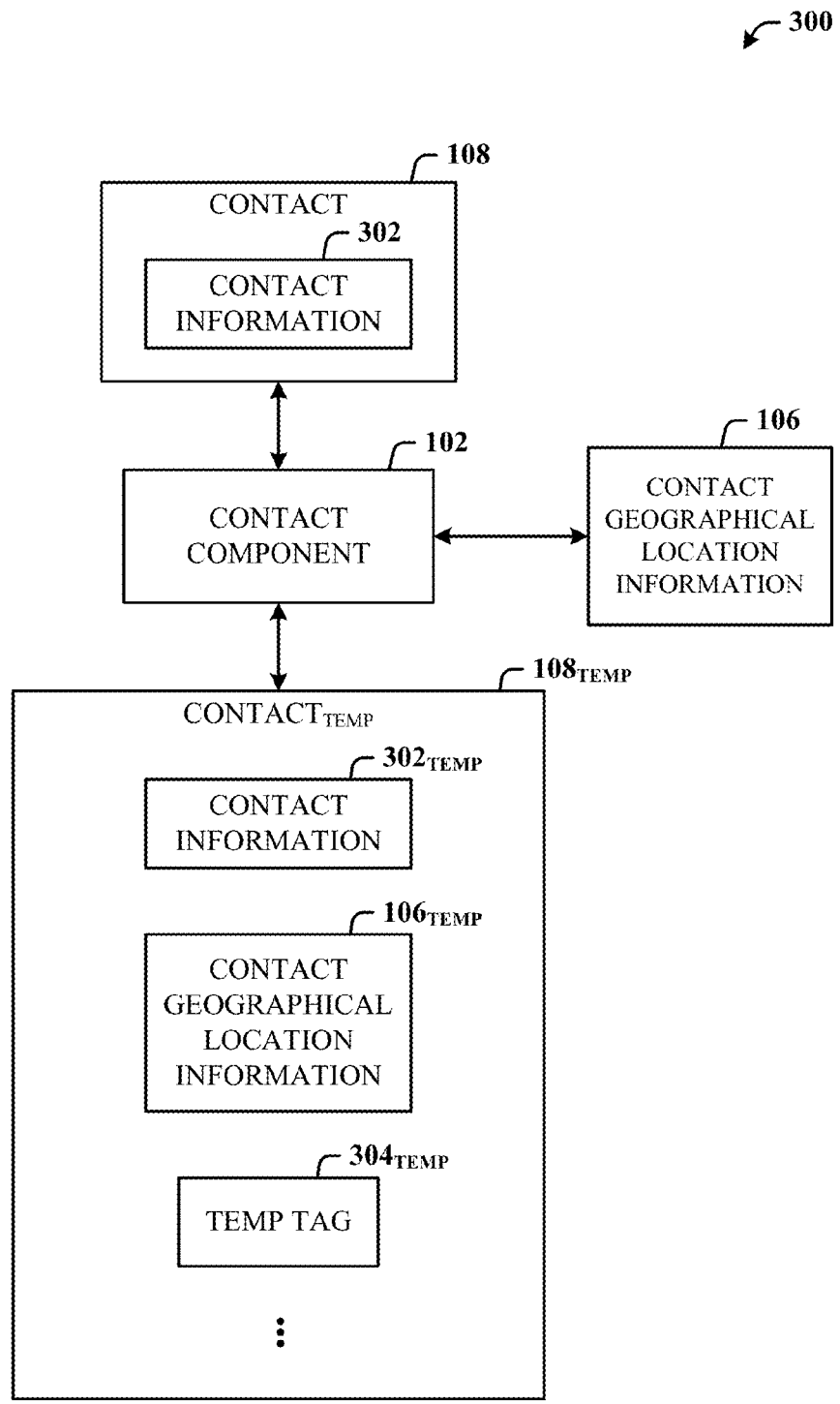
FIG. 3 illustrates an exemplary system that enables the format of the temporary contact in accordance with the disclosed architecture.

FIG. 3 illustrates an exemplary system 300 that enables a format of the temporary contact $108_{TEMP}$ in accordance with the disclosed architecture. In this example, contact information 302 included with the contact 108 is propagated to the temporary contact $108_{TEMP}$ via the contact component 102 and annotated here as contact information $302_{TEMP}$. Additionally, the contact geographical location information 106 is propagated to the temporary contact $108_{TEMP}$ via the contact component 102 and annotated here as contact geographical location information $106_{TEMP}$. The temporary contact $108_{TEMP}$ also comprises a temp tag $304_{TEMP}$ which when selected, indicates the contact 108 is to be considered a temporary contact (the temporary contact $108_{TEMP}$) unless otherwise indicated.

Although not shown, the disclosed architecture can optionally include a privacy component that enables the user to opt in or opt out of exposing personal information. The privacy component enables the authorized and secure handling of user information, such as location information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Figure 4:
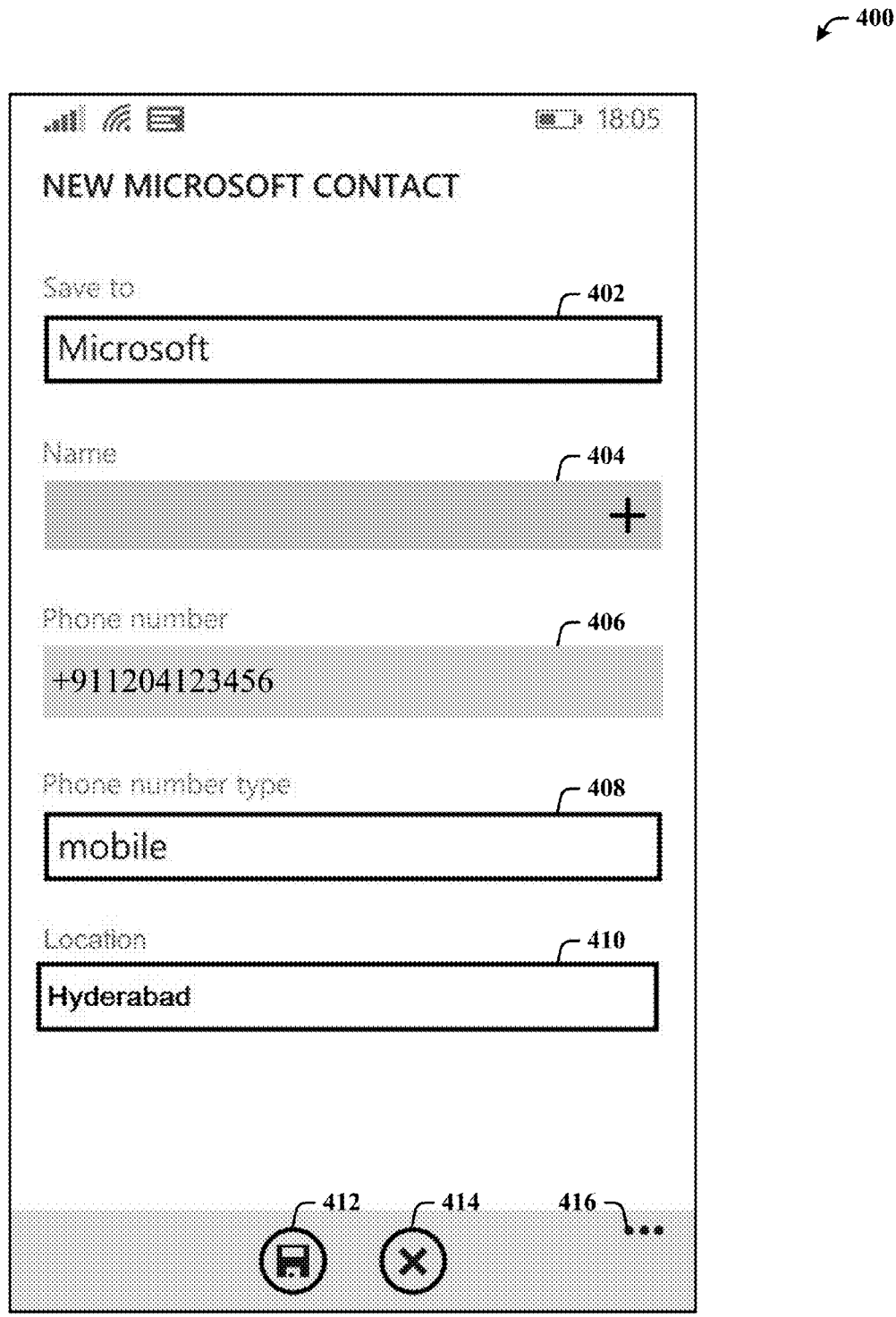
FIG. 4 illustrates an exemplary user interface for an add contact view for a newly discovered new (temporary) contact.

FIG. 4 illustrates an exemplary user interface for an add contact view 400 for a newly discovered new (temporary) contact. The systems 100 and 200 enable the generation and presentation of the add contact view 400 via the contact component 102. Here, the new contact is designated as "New Microsoft Contact". The view 400 can be automatically populated with the name of the contact list field 402 ("Microsoft") to which the new contact will be "Saved To". Additionally, a Name field 404 is provided should the user choose to enter the name of the new contact.

A Phone Number field 406 is provided in which the new contact phone number can be entered or auto-populated. A Phone Number Type field 408 is provided in which the type of new contact phone can be designated or auto-populated, such as "Mobile" for a cell phone. A Location field 410 is provided in which the contact geographical location information of the new contact can be designated or auto-populated, such as "Hyderabad" in the country India. Other interactive selections can include a Save option 412 to then save the new contact, a delete object 414 to delete the new contact record, and an additional options object 416 to select other options provided for this contact.

Figure 5:
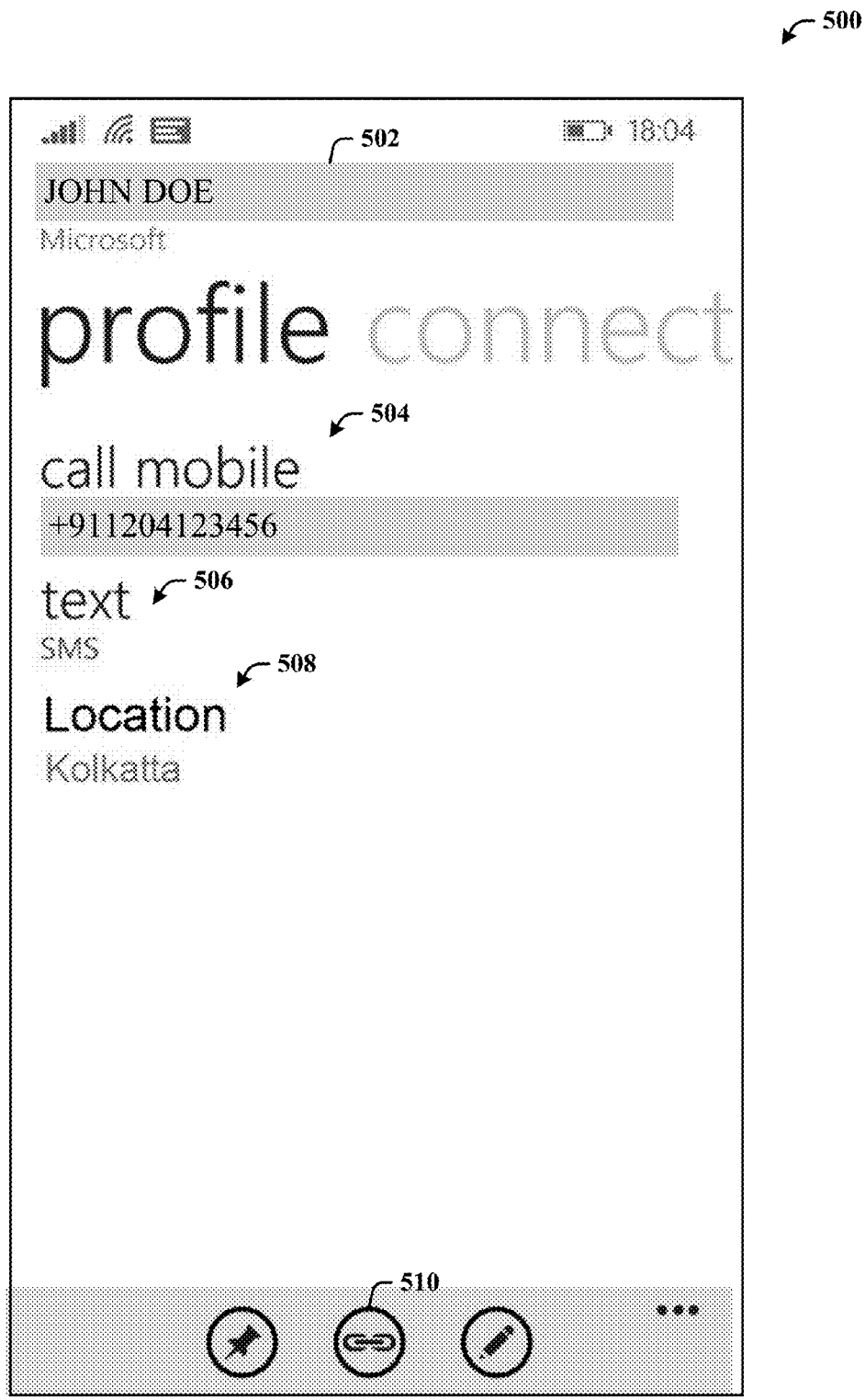
FIG. 5 illustrates an exemplary user interface for a contact view for a newly discovered temporary contact.

FIG. 5 illustrates an exemplary user interface for a contact view 500 for a newly discovered temporary contact. The systems 100 and 200 enable the generation and presentation of the contact view 500 via the contact component 102. Here, the profile information of the contact record for the temporary contact $108_{TEMP}$ is presented with the temporary contact name 502 (in the Microsoft contact list), the type of device 504 ("call Mobile") for which the phone number is associated, the type of texting 506 enabled ("SMS") and the location 508 of the temporary contact ("Kolkatta"), and linking object 510 that enables linking and synchronization of the contacts with other contact sets.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
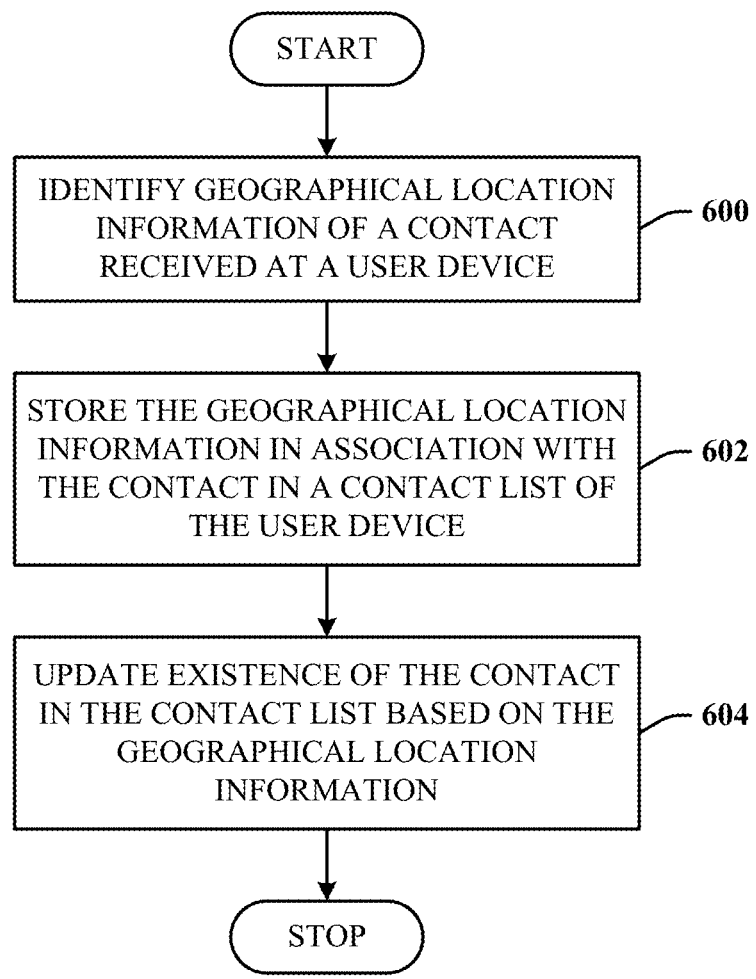
FIG. 6 illustrates a method in accordance with the disclosed architecture.

FIG. 6 illustrates a method in accordance with the disclosed architecture. At 600, geographical location information of a contact can be identified and received at (or via) a user device such as a mobile phone, mobile-capable tablet, other mobile-capable devices, and non-mobile-capable legacy devices that may not have geolocation capability but can utilize triangulation as a location determination technology. At 602, the geographical location information can be stored in association with the contact in a contact list of the user device. At 604, existence of the contact in the contact list is updated based on the geographical location information.

The method can further comprise removing the contact from the contact list when the user device is a predetermined distance from the contact. The method can further comprise removing the contact from the contact list when the user device is a predetermined time from geographical location of the contact. The method can further comprise prompting for deletion of the contact from the contact list based on geographical location of the user device.

The method can further comprise tagging the contact as a temporary contact for deletion from the contact list. The method can further comprise automatically updating the geographical location information of the contact. The method can further comprise filtering the contacts of the contact list based on the geographical location information. The method can further comprise updating the geographical location information of the contact in a social network in response to user input.

Figure 7:
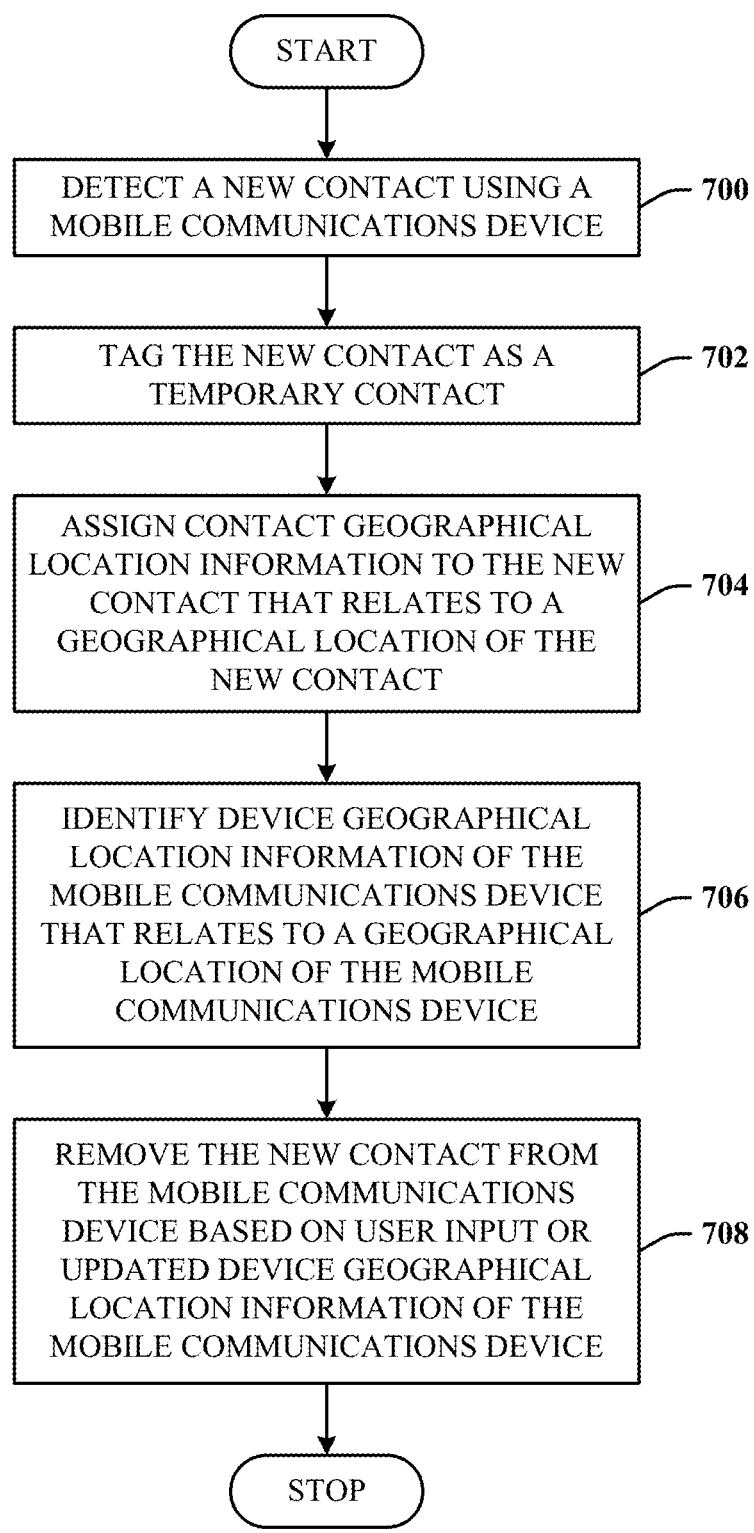
FIG. 7 illustrates an alternative method in accordance with the disclosed architecture.

FIG. 7 illustrates an alternative method in accordance with the disclosed architecture. At 700, a new contact is detected using a mobile communications device such as a mobile phone, mobile-capable tablet or other mobile-capable devices. At 702, the new contact is tagged as a temporary contact. The contact can be tagged manually by the user, automatically by the system based on spatial or temporal criteria, or both manually and automatically.

At 704, contact geographical location information (e.g., latitude-longitude coordinates, street address, or other structured data, etc.) is assigned to the new contact, where the contact geographical location information relates to a geographical location (e.g., geographical area, region, point, etc.) of the new contact.

At 706, device geographical location information of the mobile communications device is identified that relates to a geographical location of the mobile communications device. The device geographical location information can be the geolocation data commonly obtained using conventional location technologies such as GPS or triangulation, for example.

At 708, the new contact can be removed from the mobile communications device based on user input or updated device geographical location information of the mobile communications device.

The method can further comprise automatically removing the new contact from a contact list of the mobile communications device when the mobile communications device is at least one of a predetermined distance from the geographical location of the new contact or a predetermined time from the geographical location of the new contact.

The method can further comprise prompting for the user input based on the updated device geographical location information of the mobile communications device. The method can further comprise automatically storing the new contact, the tagging as the temporary contact, and the assigned contact geographical location information in at least one of a contact list of the mobile communications device or a contact list on a network.

The method can further comprise filtering a contact list of the mobile communications device for temporary contacts based on the updated device geographical location information and generating a prompt for removal of one or more of the temporary contacts.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
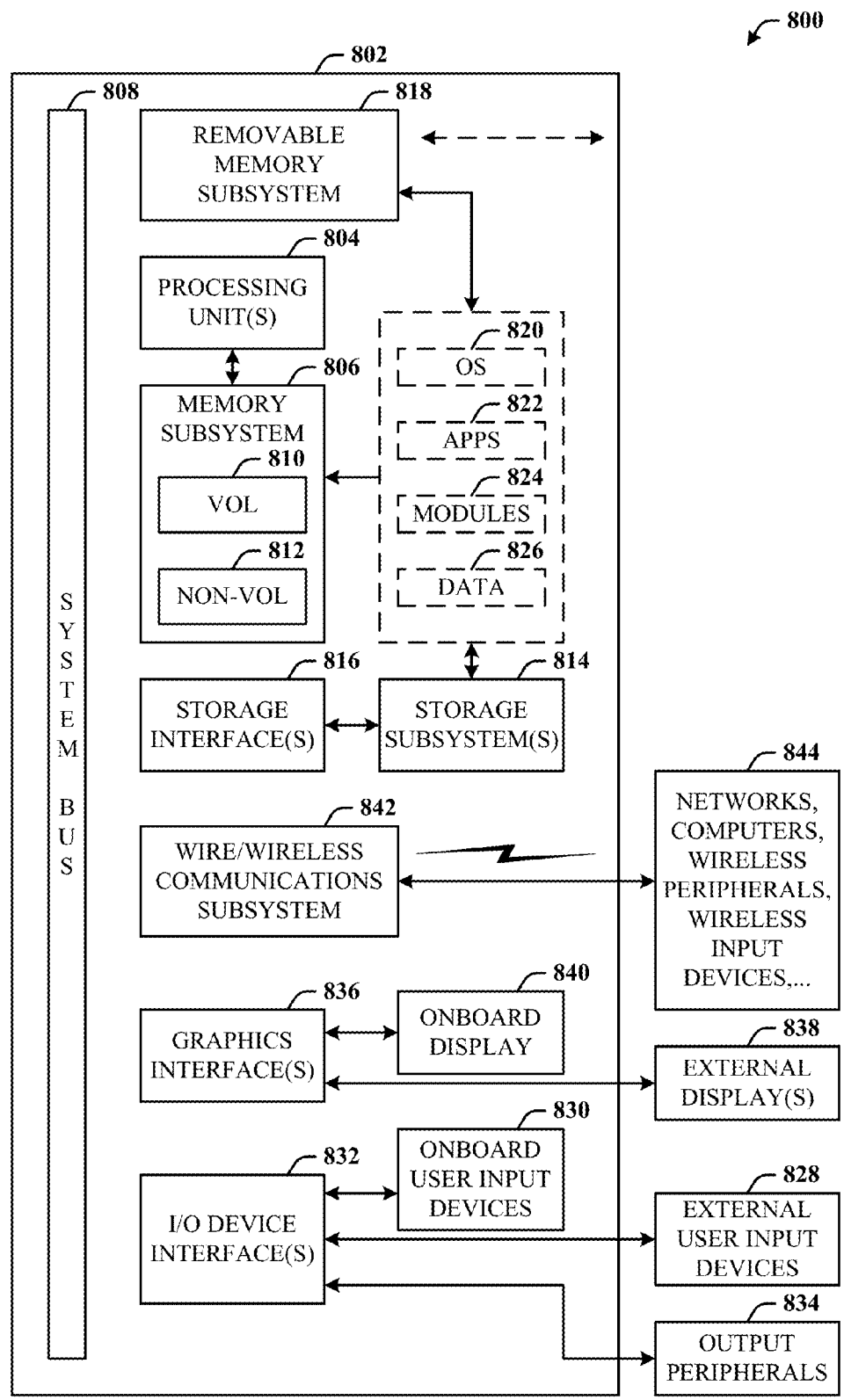
FIG. 8 illustrates a block diagram of a computing system that executes temporary contacts in accordance with the disclosed architecture.

Referring now to FIG. 8, there is illustrated a block diagram of a computing system 800 that executes temporary contacts in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 800 for implementing various aspects includes the computer 802 having microprocessing unit(s) 804 (also referred to as microprocessor(s) and processor(s)), a computer-readable storage medium (where the medium is any physical device or material on which data can be electronically and/or optically stored and retrieved) such as a system memory 806 (computer readable storage medium/media also include magnetic disks, optical disks, solid state drives, external memory systems, and flash memory drives), and a system bus 808. The microprocessing unit(s) 804 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 802 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 806 can include computer-readable storage (physical storage) medium such as a volatile (VOL) memory 810 (e.g., random access memory (RAM)) and a non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the microprocessing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components and circuits. The storage subsystem(s) 814 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include items and components of the system 100 of FIG. 1, items and components of the system 200 of FIG. 2, items and components of the system 300 of FIG. 3, items and user interface view 400 of FIG. 4, items and user interface view 500 of FIG. 5, and the methods represented by the flowcharts of FIGS. 6 and 7, for example.

Generally, programs include routines, methods, data structures, other software components, etc., that perform particular tasks, functions, or implement particular abstract data types. All or portions of the operating system 820, applications 822, modules 824, and/or data 826 can also be cached in memory such as the volatile memory 810 and/or non-volatile memory, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 802, and include volatile and non-volatile internal and/or external media that is removable and/or non-removable. For the computer 802, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 802, programs, and data using external user input devices 828 such as a keyboard and a mouse, as well as by voice commands facilitated by speech recognition. Other external user input devices 828 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 802, programs, and data using onboard user input devices 830 such a touchpad, microphone, keyboard, etc., where the computer 802 is a portable computer, for example.

These and other input devices are connected to the microprocessing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising: means for identifying geographical location information of a contact received at a user device; means for storing the geographical location information in association with the contact in a contact list of the user device; and means for updating existence of the contact in the contact list based on the geographical location information.

The disclosed architecture can be implemented as an alternative system, comprising: means for detecting a new contact using a mobile communications device; means for tagging the new contact as a temporary contact; means for assigning contact geographical location information to the new contact that relates to a geographical location of the new contact; means for identifying device geographical location information of the mobile communications device that relates to a geographical location of the mobile communications device; and, means for removing the new contact from the mobile communications device based on user input or updated device geographical location information of the mobile communications device.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   a memory storing computer-executable instructions that, when executed by the at least one processor, cause the system to perform a method, the method comprising:
      receiving contact geographical location information related to a new contact of a contact list;
      assigning the contact geographical location information to the new contact;
      enabling tagging of the new contact as a temporary contact;
      causing presentation of a notification based on one or more spatial criteria; and
      receiving, based on the notification, an instruction to either delete the temporary contact from the contact list of a user device or preserve the temporary contact as a persisted contact in the contact list of the user device.

2. The system of claim 1, wherein the spatial criteria comprises a distance of the user device from a geographical location of the temporary contact.

3. The system of claim 1, wherein the method further comprises automatically fetching contact information from social networking websites and contact applications in response to the new contact.

4. The system of claim 1, wherein the method further comprises storing the contact geographical location information and the temporary contact in the contact list.

5. The system of claim 1, wherein the method further comprises receiving, through a user interface, the new contact.

6. The system of claim 1, further comprising a global positioning system to capture the contact geographical location information of the new contact and device geographical location information of the user device.

7. A computer-implemented method, comprising:
identifying geographical location information of a new contact received at a user device;
storing the geographical location information in association with the new contact in a contact list of the user device;
identifying the new contact in the contact list as a temporary contact;
causing presentation of a notification based on the geographical location information of the temporary contact; and
receiving, based on the notification, an instruction to either delete the temporary contact from the contact list or preserve the temporary contact as a persisted contact in the contact list.

8. The method of claim 7, further comprising based on the received instruction to delete, removing the temporary contact from the contact list when the user device is a predetermined distance from a geographical location included in the geographical location information of the temporary contact.

9. The method of claim 7, further comprising based on the received instruction to delete, removing the contact from the contact list when the user device is a predetermined distance from a geographical location included in the geographical location information of the temporary contact for a predetermined amount of time.

10. The method of claim 7, further comprising automatically updating the geographical location information of the new contact.

11. The method of claim 7, further comprising filtering the contacts of the contact list based on the geographical location information.

12. The method of claim 7, further comprising updating the geographical location information of the new contact in a social network in response to user input.

13. A computer-implemented method, comprising:
detecting a new contact using a mobile communications device;
tagging the new contact as a temporary contact;
assigning contact geographical location information to the temporary contact that relates to a geographical location of the temporary contact;
identifying device geographical location information of the mobile communications device that relates to a geographical location of the mobile communications device;
based on at least one of a spatial or a temporal criteria associated with the device geographical location of the mobile communications device and on updated device geographical location information of the mobile communications device, causing presentation of a notification regarding one of:
deletion of the temporary contact; or
preservation of the temporary contact as a persisted contact.

14. The method of claim 13, wherein:
the spatial criteria comprises a predetermined distance from the geographical location of the temporary contact;
the temporal criteria comprises a predetermined amount of time that the mobile communications device is a predetermined distance from the geographical location of the temporary contact; and
the method further comprises:
receiving, based on the notification, an instruction to delete the temporary contact; and
based on the instruction to delete, removing the temporary contact from a contact list of the mobile communications device when the mobile communications device is at least one of the predetermined distance from the geographical location of the temporary contact or is the predetermined distance from the geographical location of the temporary contact for the predetermined amount of time.

15. The method of claim 14, wherein the predetermined distance from the geographical location comprises a geofence and the predetermined amount of time is user defined.

16. The method of claim 13, further comprising:
receiving, based on the notification, the instruction to preserve the temporary contact as the persisted contact in a contact list; and
preserving the temporary contact as the persisted contact.

17. The method of claim 13, further comprising automatically storing the new contact, the tagging as the temporary contact, and the assigned contact geographical location information in at least one of a contact list of the mobile communications device or a contact list on a network.

18. The method of claim 13, further comprising filtering a contact list of the mobile communications device for temporary contacts based on the updated device geographical location information prior to causing the presentation of the notification.

19. The method of claim 13, further comprising automatically fetching contact information from network-based sources in response to the detection of the new contact.

20. The method of claim 19, further comprising:
in response to automatically fetching the contact information, automatically detecting the new contact is a duplicate contact to an existing contact; and
linking the new contact to the existing contact.

* * * * *